(12) United States Patent
Stephens et al.

(10) Patent No.: US 8,419,578 B2
(45) Date of Patent: Apr. 16, 2013

(54) HYDROSTATIC REGENERATIVE BRAKING TRANSMISSION FOR MOTOR VEHICLES

(75) Inventors: Carl F. Stephens, Liverpool, NY (US); Joseph G. Mueller, Manlius, NY (US)

(73) Assignee: Magna Powertrain USA, Inc., Troy, MI (US)

(*) Notice: Subject to any disclaimer, the term of this patent is extended or adjusted under 35 U.S.C. 154(b) by 683 days.

(21) Appl. No.: 12/633,077

(22) Filed: Dec. 8, 2009

(65) Prior Publication Data

US 2010/0144476 A1  Jun. 10, 2010

Related U.S. Application Data

(60) Provisional application No. 61/121,267, filed on Dec. 10, 2008.

(51) Int. Cl.
*F16H 47/04* (2006.01)

(52) U.S. Cl.
USPC ............................................. 475/72; 475/213

(58) Field of Classification Search ............... 475/72, 475/80, 83, 210, 213
See application file for complete search history.

(56) References Cited

U.S. PATENT DOCUMENTS

| | | | |
|---|---|---|---|
| 4,196,587 A | 4/1980 | Shiber | |
| 4,364,229 A | 12/1982 | Shiber | |
| 4,441,573 A | 4/1984 | Carman et al. | |
| 5,443,429 A * | 8/1995 | Baxter, Jr. ..................... | 475/204 |
| 6,712,166 B2 | 3/2004 | Rush et al. | |
| 6,719,656 B2 * | 4/2004 | Bowen ............................ | 475/5 |
| 7,082,757 B2 | 8/2006 | Teslak et al. | |
| 7,147,078 B2 | 12/2006 | Teslak et al. | |
| 7,232,192 B2 | 6/2007 | Teslak et al. | |
| 7,273,122 B2 | 9/2007 | Rose | |
| 2002/0193201 A1 * | 12/2002 | Frost ............................. | 475/288 |
| 2004/0173396 A1 | 9/2004 | Rush et al. | |
| 2006/0058146 A1 * | 3/2006 | Brissenden et al. .......... | 475/198 |
| 2006/0118346 A1 | 6/2006 | Rampen et al. | |
| 2006/0276290 A1 * | 12/2006 | Fabry et al. ..................... | 475/72 |
| 2007/0049451 A1 * | 3/2007 | Mizon et al. .................. | 475/210 |
| 2007/0278027 A1 | 12/2007 | Gray et al. | |
| 2008/0251302 A1 | 10/2008 | Lynn et al. | |

OTHER PUBLICATIONS

Frank Nagel, Dr. Christine Ehrt; Hydrostatic Regenerative Brake System (HRB), Bosch Rexroth AG, Mobile 2006, p. 1-8.

* cited by examiner

*Primary Examiner* — Justin Holmes
*Assistant Examiner* — Huan Le
(74) *Attorney, Agent, or Firm* — Dickinson Wright

(57) ABSTRACT

A transmission for a vehicle including a hydrostatic regenerative braking system includes a first rotatable shaft having a first end adapted to be driven by a first prime mover and a second end adapted to be coupled to a vehicle driveline. A second shaft selectively drives the first shaft and is adapted to drive a hydraulic pump of a second prime mover. A planetary gearset includes a first member restricted from rotation, a second member and a third member. A transfer mechanism includes a first sprocket fixed for rotation with the second member, a second sprocket fixed for rotation with the input shaft and a flexible member interconnecting the first and second sprockets. A clutch transfers torque between the third member and the first shaft.

23 Claims, 3 Drawing Sheets

HYDROSTATIC REGENERATIVE BRAKING TRANSMISSION FOR MOTOR VEHICLES

CROSS-REFERENCE TO RELATED APPLICATIONS

This application claims the benefit of U.S. Provisional Application No. 61/121,267, filed on Dec. 10, 2008. The entire disclosure of the above application is incorporated herein by reference.

BACKGROUND

The present disclosure relates to hydrostatic regenerative braking for efficient use of energy of a vehicle. More particularly, a transmission for coordinating the flow of power between a prime mover, a hydraulic energy storage system and the vehicle wheels is discussed.

Regenerative drive systems including hybrid hydraulic arrangements have been applied to motor vehicles in the past. While conventional vehicle braking systems typically convert a vehicle's kinetic energy into heat energy, hydrostatic regenerative braking systems convert a moving vehicle's kinetic energy into stored hydraulic energy. The hydraulic energy is typically stored in an accumulator for later use to propel the vehicle. At least one hybrid hydraulic drive system includes a hydraulic pump/motor selectively operable to transfer energy from the vehicle driveline to a hydraulic storage device, such as during a braking event, or transfer energy from the hydraulic storage device to the driveline, such as during vehicle acceleration. When the hybrid hydraulic system stores power from the driveline, the hydraulic pump/motor acts as a pump to provide pressurized fluid to the accumulator. When the hybrid hydraulic system transfers power to the driveline, the hydraulic pump/motor acts as a motor driven by the energy stored in the accumulator.

Some vehicles include transmissions for transferring power between the driveline and the hydraulic storage device. At least one transmission cooperates with a hydrostatic regenerative braking system and includes a two gear design with a clutch positioned at an output shaft of the transmission. While this design may provide some benefit, it requires a relatively large diameter driven gear to provide a useful gear reduction ratio. Large packaging volume requirements and high weight are associated with this transmission. Due to the clutch being positioned downstream of the gear reduction mechanism, the clutch is required to transmit a torque approximately three times greater than the pump torque. A relatively large clutch is required to transfer the torque. The size and weight of the transmission are accordingly increased. Furthermore, with the two gear design, only one output drive ratio is available. To provide different versions with different ratios, new sets of gears for each ratio must be provided. Accordingly, a need exists in the art for an improved hydrostatic regenerative braking transmission.

SUMMARY

This section provides a general summary of the disclosure, and is not a comprehensive disclosure of its full scope or all of its features.

A transmission for a vehicle including a driveline powered by first and second prime movers and a hydrostatic regenerative braking system for transferring energy from the driveline to the second prime mover is provided. The transmission includes a first rotatable shaft having a first end adapted to be driven by the first prime mover and a second end adapted to be coupled to the driveline. A second shaft selectively drives the first shaft and is adapted to drive a hydraulic pump/motor of the second prime mover. A planetary gearset includes a first member restricted from rotation, a second member and a third member. A transfer mechanism includes a first sprocket fixed for rotation with the second member, a second sprocket fixed for rotation with the second shaft and a flexible member interconnecting the first and second sprockets. A clutch transfers torque between the third member and the first shaft.

In another form, a transmission for a hydraulic hybrid vehicle includes a driveline powered by first and second prime movers. The vehicle also includes a hydrostatic regenerative braking system for transferring energy to the second prime mover. The transmission includes a through shaft having a first end adapted to be driven by the first prime mover and a second end adapted to be coupled to the driveline. An input shaft is selectively drivingly coupled to the through shaft and is adapted to drive a hydraulic pump/motor of the second prime mover. A planetary gearset includes a first member restricted from rotation, a second member fixed for rotation with the through shaft and a third member. A transfer mechanism includes a first sprocket, a second sprocket fixed for rotation with the input shaft and a flexible member drivingly interconnecting the first and second sprockets. A clutch is operable to transfer torque between the third member of the planetary gearset and the first sprocket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
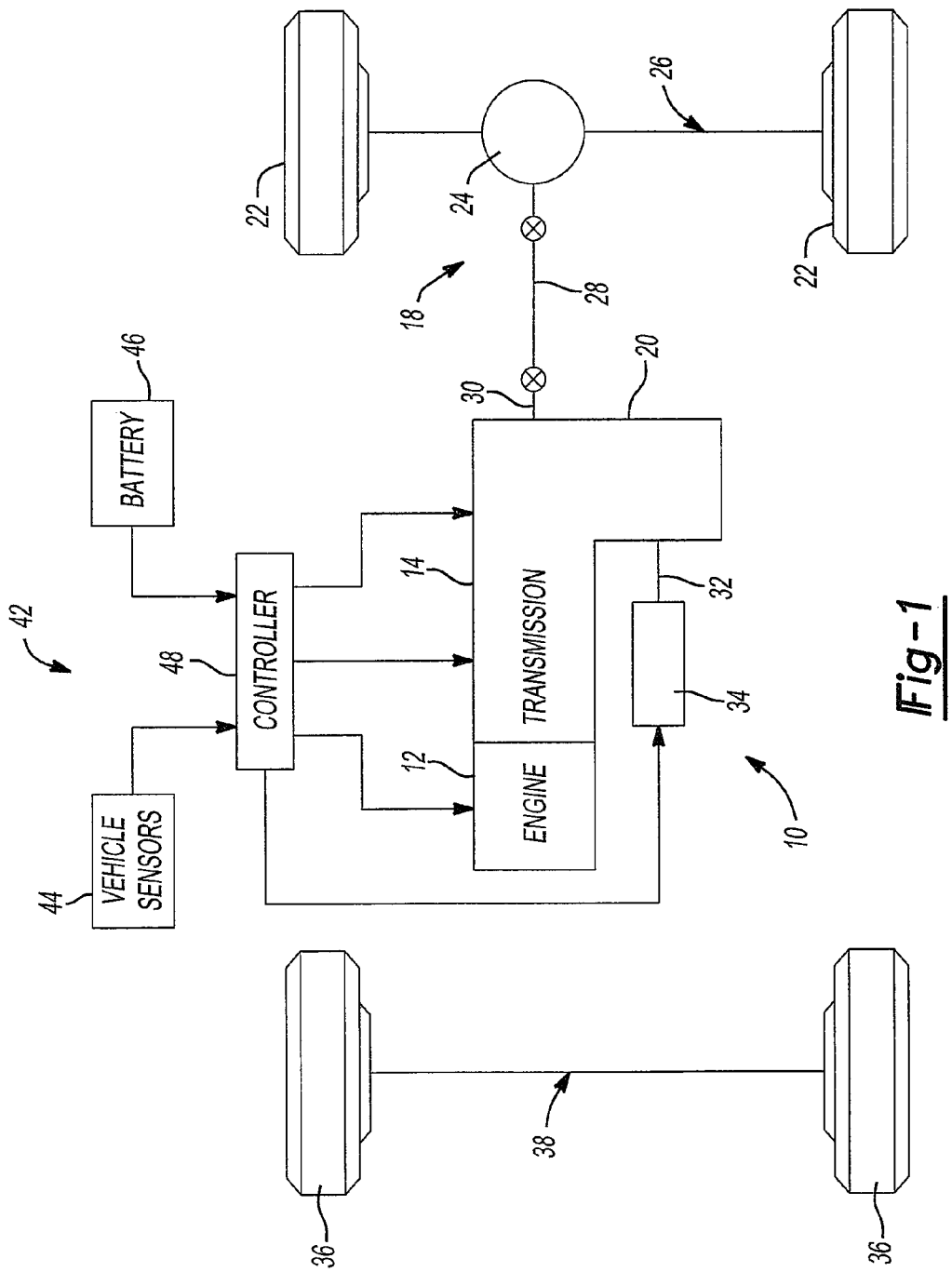
FIG. 1 is a schematic depicting a transmission of the present disclosure for use in an exemplary hydraulic hybrid vehicle.

With reference to FIG. 1 of the drawings, a parallel hydraulic hybrid powertrain 10 for a hybrid motor vehicle is shown to include an internal combustion engine 12 and a transmission 14 arranged to transfer motive power (i.e., drive torque) from engine 12 to a driveline 18. In the particular arrangement shown, driveline 18 is the rear driveline and includes a pair of rear wheels 22 connected to a rear differential unit 24 associated with a rear axle assembly 26. A rear prop shaft 28 interconnects rear differential 24 to a through shaft 30 of transmission 14. A hydrostatic drive input shaft 32 of transmission 14 is drivingly coupled to an energy storage system 34. A pair of front wheels 36 are rotatably supported on a front axle 38. Powertrain 10 is also associated with a powertrain control system 42 generally shown to include an array of vehicle sensors 44, a battery 46 and a controller 48. As will be detailed, controller 48 is operable, among other things, to control actuation of power transfer between engine 12, energy storage system 34 and driven wheels 22.

Figure 2:
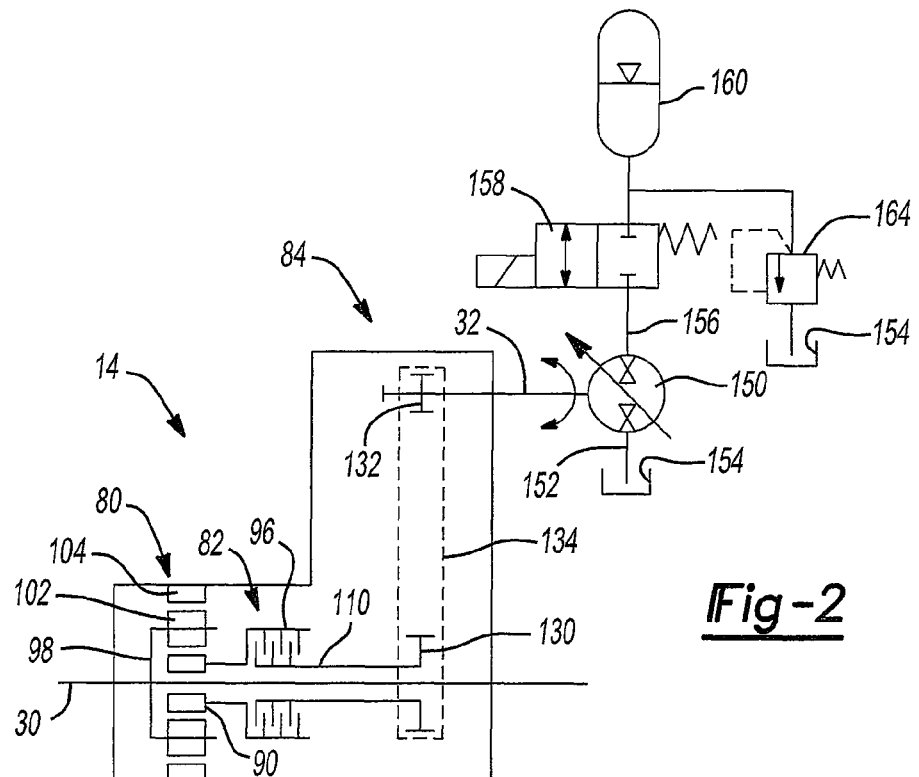
FIG. 2 is a schematic depicting the transmission of the present invention in cooperation with a hydraulic energy storage system.
Figure 3:
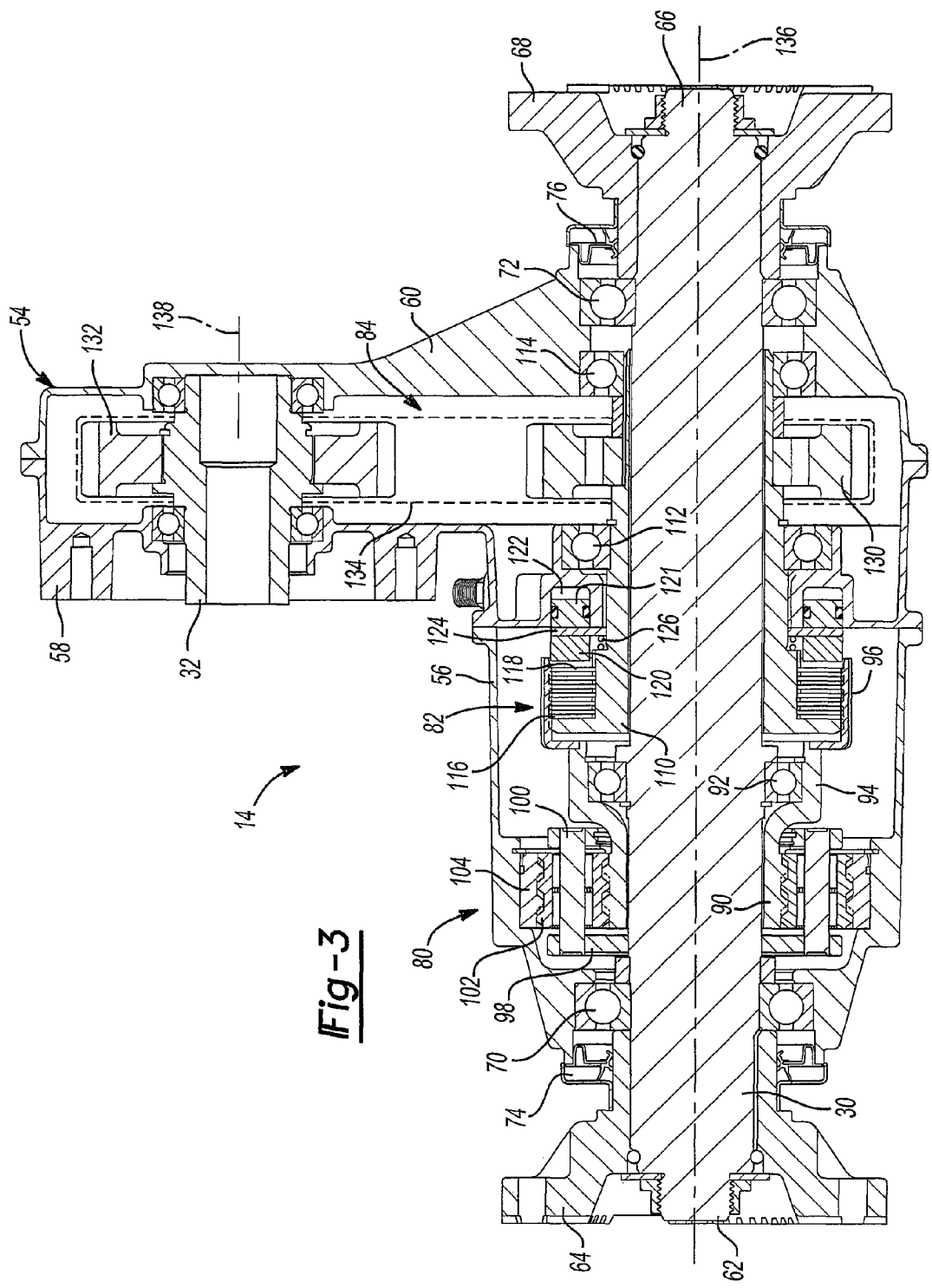
FIG. 3 is a sectional view of the transmission.

Referring primarily to FIGS. 2 and 3, the components of transmission 14 and energy storage system 34 are illustrated in sufficient detail to provide a clear understanding of their construction and operation. To this end, transmission 14 includes a housing 54 constructed from a first shell 56, a second shell 58 and a third shell 60 interconnected to one another along their periphery. Through shaft 30 extends through housing 54 and includes a first end 62 having an input flange 64 fixed for rotation with through shaft 30. Input flange 64 is driven by a rotary output of engine 12. Through shaft 30 includes a second end 66 extending beyond housing 54 and fixed for rotation with an output flange 68. Output flange 68 is fixed for rotation with prop shaft 28. First and second bearings 70, 72 support through shaft 30 for rotation within housing 54. A seal assembly 74 is positioned radially between input flange 64 and housing 54 to restrict ingress of contaminants toward bearing 70. In similar fashion, a seal assembly 76 is radially positioned between output flange 68 and housing 54 to protect bearing 72 from contamination and retain lubricant.

Transmission 14 includes a planetary gearset 80, a friction clutch 82 and a chain drive assembly 84 for transferring energy between driveline 18 and energy storage system 34. As will be described in greater detail, friction clutch 82 is operable to selectively drivingly interconnect through shaft 30 and input shaft 32. Accordingly, friction clutch 82 is controlled to selectively transfer energy to or transfer energy from energy storage system 34.

Planetary gearset 80 includes a sun gear 90 supported for rotation on through shaft 30 by a bearing 92. Sun gear 90 includes an axially extending sleeve portion 94 fixed for rotation with the drum 96 of friction clutch 82. Planetary gearset 80 also includes a carrier 98 having a plurality of pinion shafts 100 rotatably supporting pinion gears 102. A ring gear 104 is fixed for rotation with housing 54. Pinion gears 102 are in constant meshed engagement with sun gear 90 and ring gear 104. Carrier 98 is fixed for rotation with through shaft 30. The number of teeth on the sun gear 90, pinion gears 102 and ring gear 104 define the gear reduction ratio provided by planetary gearset 80. In the embodiment depicted in FIG. 3, planetary gearset 80 provides a planetary gear reduction ratio of 2.72:1. It should be appreciated that other gear reduction ratios may be provided, if desired. A planetary gear reduction ratio of 3.21:1 is also contemplated.

Clutch 82 includes a hub 110 supported for rotation within housing 54 by bearings 112, 114. Clutch 82 further includes a plurality of outer clutch plates 116 fixed for rotation with but axially moveable relative to drum 96. A plurality of inner clutch plates 118 are fixed for rotation and axially moveable relative to hub 110. An apply plate 120 is axially moveable to apply a compressive force to inner clutch plates 118 and outer clutch plates 116 to transfer torque between drum 96 and hub 110. An axially moveable piston 121 is positioned within a cavity 122. Pressurized fluid may be provided to cavity 122 to cause axial translation of piston 121. A thrust bearing 124 is axially positioned between piston 121 and apply plate 120 to allow relative rotation therebetween. The magnitude of torque transferred by friction clutch 82 may be controlled by varying the magnitude of pressure provided to cavity 122. A return spring 126 urges apply plate 120 away from the interleaved inner and outer clutch plates 118, 116.

Clutch 82 is operable in an open mode when apply plate 120 is not forced into contact with inner clutch plates 118 and outer clutch plates 116. At this time, torque is not transferred between through shaft 30 and hydrostatic drive input shaft 32. Friction clutch 82 is also operable in a torque transferring or closed mode by providing pressurized fluid to cavity 122, causing piston 121 to transfer force through apply plate 120 and frictionally engage the inner clutch plates 118 with outer clutch plates 116. At this time, torque is transferred from shaft 30 through carrier 98, planetary gearset 80, drum 96, hub 110 and chain drive assembly 84 to input shaft 32.

Chain drive assembly 84 includes a first sprocket 130 fixed for rotation with hub 110. A second sprocket 132 is fixed for rotation with hydrostatic drive input shaft 32. A flexible power transfer member such as a chain 134 drivingly interconnects first sprocket 130 and second sprocket 132. It should be appreciated that through shaft 30 rotates about an axis of rotation 136 while hydrostatic drive input shaft 32 and second sprocket 132 rotate about an axis of rotation identified at reference numeral 138. Axes 136 and 138 extend substantially parallel to one another.

The drive ratio provided by chain drive assembly 84 may be chosen from two or more chain drive modules depending on the customer's needs. It is contemplated that three different chain drive ratios may be provided through various combinations of two different sprockets. In particular, it is contemplated that a first chain drive module having a chain drive ratio of 1.20:1 may be provided by forming 40 teeth on second sprocket 132 and forming 48 teeth on first sprocket 130. Coupled in combination with a planetary gear reduction ratio of 2.72:1 previously described, power may be provided from energy storage system 34 through transmission 14 at an overall drive ratio of 3.26:1. Alternatively, a second chain drive module having a drive ratio of 1:1 may be provided if both sprockets 130, 132 were equipped with 40 or 48 teeth. If the chain drive ratio is 1:1, the overall drive ratio of transmission 14 will be the same as the planetary gear reduction ratio of 2.72:1. Lastly, it is contemplated that a third chain drive module having a chain drive ratio of 0.83:1 may be provided by fixing the 48 tooth sprocket for rotation with input shaft 32 and fixing the 40 tooth sprocket for rotation with hub 110. An overall drive ratio of 2:27:1 results.

As best shown in FIG. 2, energy storage system 34 includes a hydraulic pump/motor 150 drivingly coupled to hydrostatic drive input shaft 32. Hydraulic pump/motor 150 includes an inlet 152 in communication with a low pressure reservoir or sump 154. Pump/motor 150 includes an outlet 156 in communication with highly pressurized fluid. A valve 158 is plumbed in communication with outlet 156. A high pressure accumulator 160 is positioned downstream of valve 158. A pressure relief valve 164 is in communication with accumulator 160 and operable to transfer fluid to sump 154 if an over pressure condition exists. Valve 158 is a solenoid-controlled, two-position valve operable to selectively open and close a passageway between outlet 156 and accumulator 160.

Pump/motor 150 may be an adjustable displacement axial piston pump or some other type of variable output pump. During vehicle braking, variable pump/motor 150 is provided energy from the vehicle driveline by applying friction clutch 82. The braking torque may be controlled by adjusting the displacement of pump/motor 150. During the pumping operation, controller 48 signals valve 158 to allow pressurized fluid to be pumped from pump/motor 150 to accumulator 160. Once the accumulator charging process has been completed, controller 48 signals valve 158 to move to the closed position thereby trapping pressurized fluid within accumulator 160. Substantially at the same time, controller 48 signals friction clutch 82 to operate in the open mode. At this time, motive power for the vehicle is provided only by engine 12 and torque is not transferred between driveline 18 and energy storage system 34.

To transfer torque to driven wheels 22, clutch 82 may remain in the open mode if power is to be transferred only from engine 12 to driveline 18 and rear wheels 22. If a supplemental hydrostatic power flow to rear wheels 22 is desired, controller 48 moves valve 158 to allow fluid communication between accumulator 160 and pump/motor 150. Pressurized fluid acting on pump/motor 150 drives hydrostatic drive input shaft 32 and chain drive assembly 84. Pressurized fluid, possibly from another source, is provided to cavity 122 to act on piston 121 and place friction clutch in a torque transferring or closed mode. As such, torque continues to be transferred through clutch 82, planetary gearset 80 and through shaft 30 to drive rear wheels 22. To exit the hydrostatic assist mode, controller 48 causes valve 158 to shift and block fluid transfer between accumulator 160 and pump/motor 150. Furthermore, clutch 82 is placed in the open mode. It is contemplated that the charging and discharging of accumulator 160 may occur throughout vehicle operation to greatly improve the energy efficiency of the vehicle.

Figure 4:
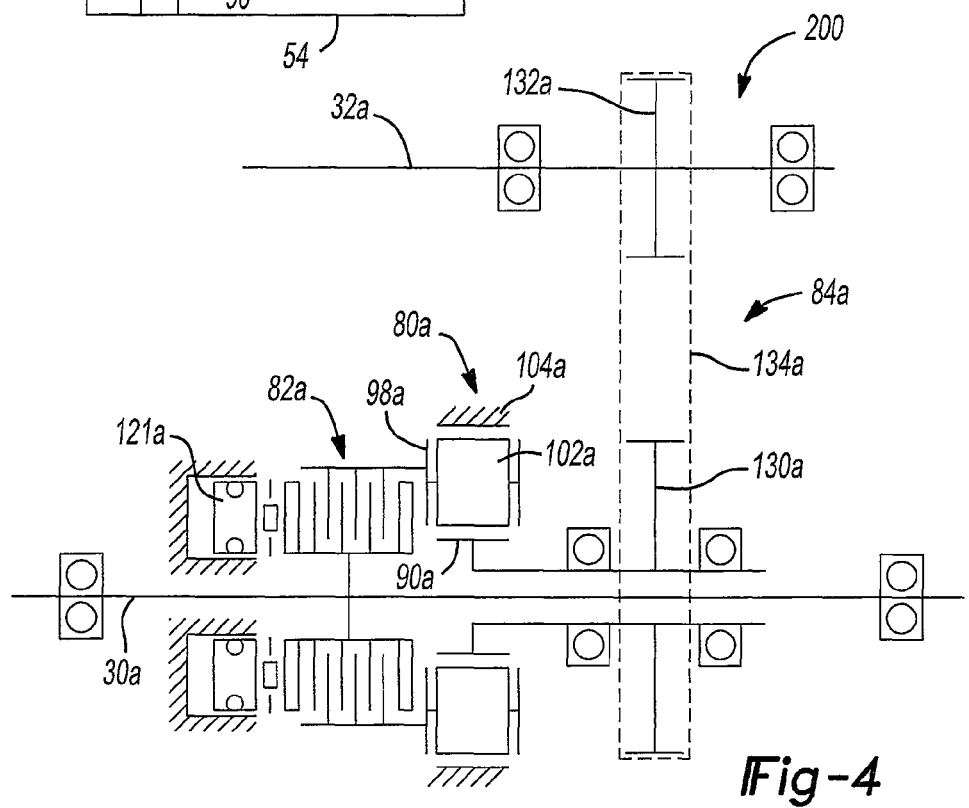
FIG. 4 is a schematic depicting an alternate transmission.

FIG. 4 depicts an alternate transmission 200 for use in a parallel hydraulic hybrid vehicle as previously described in relation to transmission 14. Transmission 200 is substantially similar to transmission 14. Accordingly, similar elements will be identified with like reference numerals including an "a" suffix. Primarily, transmission 200 differs from transmission 14 in that the position of friction clutch 82a relative to planetary gearset 80a is reversed with regard to the relative position of friction clutch 82 and planetary gearset 80. In particular, when power flows from energy storage system 34, clutch 82a is located downstream of planetary gearset 80a. Accordingly, the clutch torque capacity of clutch 82a must be higher than that of clutch 82 previously described. However, it should also be appreciated that the carrier 98, pinion gears 102 and sun gear 90 of transmission 14 rotate when through shaft 30 rotates. Corresponding parasitic losses are associated with the configuration of transmission 14. On the contrary, the components of planetary gearset 80a of transmission 200 only rotate when clutch 82a is in the closed position. During vehicle operation when clutch 82a is open, the components of planetary gearset 80a are not rotated. It should be appreciated that chain drive assemblies 84 and 84a rotate only when clutches 82 and 82a are closed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A transmission for a vehicle including a driveline powered by first and second prime movers, the vehicle also including a hydrostatic regenerative braking system for transferring energy from the driveline to the second prime mover, the transmission comprising:

a first rotatable shaft having a first end adapted to be driven by the first prime mover and a second end adapted to be coupled to the driveline;

a second rotatable shaft selectively drivingly coupled to the first shaft and adapted to drive a hydraulic pump/motor of the second prime mover;

a planetary gearset including a first member restricted from rotation, a second member and a third member;

a transfer mechanism including a first sprocket, a second sprocket driven by the second shaft and a flexible member drivingly interconnecting the first and second sprockets; and a clutch operable to transfer torque between the third member of the planetary gearset and one of the first shaft and the first sprocket, wherein the second member of the planetary gearset is fixed to the other of the first shaft and the first sprocket.

2. The transmission of claim 1, wherein the first and second sprockets are selected from one of three modules defining a drive ratio less than 1, equal to 1 and greater than 1, respectively.

3. The transmission of claim 1, wherein the clutch includes a hub, a drum and a plurality of clutch plates, the hub including an axially extending sleeve supported for rotation by bearings.

4. The transmission of claim 1, wherein the sun gear is integrally formed with a cylindrical sleeve supported for rotation by bearings.

5. The transmission of claim 1, wherein the clutch is operably disposed between the planetary gearset and the second prime mover.

6. The transmission of claim 5, wherein the first planetary gearset member includes a ring gear, the second planetary gearset member includes a carrier, and the third planetary gearset member includes a sun gear.

7. The transmission of claim 1 further including an accumulator in receipt of pressurized fluid provided by the hydraulic pump/motor.

8. The transmission of claim 7 further including a valve for selectively ceasing and allowing fluid to flow between the pump/motor and the accumulator.

9. The transmission of claim 1, wherein each of the planetary gearset, the clutch and the transfer mechanism are contained within a housing, the first shaft extending through opposite ends of the housing.

10. The transmission of claim 9 further including a piston slidably positioned within a bore formed in the housing for applying an actuation force to the clutch.

11. The transmission of claim 9 wherein the sun gear is integrally formed with a cylindrical sleeve supported for rotation by bearings positioned within the housing.

12. The transmission of claim 1, wherein the planetary gearset is operably disposed between the clutch and the second prime mover.

13. The transmission of claim 12, wherein the first member of the planetary gearset includes a ring gear, the second member includes a sun gear, and the third member includes a carrier supporting pinion gears meshed with the sun gear and the ring gear.

14. The transmission of claim 13, wherein the carrier is fixed for rotation with the first shaft, and wherein the clutch is selectively operable to couple the sun gear to the first sprocket.

15. The transmission of claim 13, wherein the sun gear is fixed for rotation with the first sprocket, and wherein the clutch is selectively operable to couple the carrier to the first shaft.

16. A transmission for a hydraulic hybrid vehicle including a driveline powered by first and second prime movers, the vehicle also including a hydrostatic regenerative braking system for transferring energy to the second prime mover, the transmission comprising:
- a through shaft having a first end adapted to be driven by the first prime mover and a second end adapted to be coupled to the driveline;
- an input shaft selectively drivingly coupled to the through shaft and adapted to drive a hydraulic pump/motor of the second prime mover;
- a planetary gearset including a first member restricted from rotation, a second member fixed for rotation with the through shaft and a third member;
- a transfer mechanism including a first sprocket, a second sprocket fixed for rotation with the input shaft and a flexible member drivingly interconnecting the first and second sprockets; and
- a clutch operable to transfer torque between the third member of the planetary gearset and the first sprocket.

17. The transmission of claim 16, wherein the planetary gearset is operably disposed between the clutch and the second prime mover.

18. The transmission of claim 16 further including an accumulator in receipt of pressurized fluid provided by the hydraulic pump/motor and a valve for selectively ceasing and allowing fluid to flow between the pump/motor and the accumulator.

19. The transmission of claim 16, wherein each of the planetary gearset, the clutch and the transfer mechanism are contained within a housing, the through shaft extending through opposite ends of the housing.

20. The transmission of claim 19 further including a piston slidably positioned within a bore formed in the housing for applying an actuation force to the clutch.

21. A powertrain for a hybrid motor vehicle, comprising:
- an internal combustion engine operable to generate rotary power;
- a driveline including a pair of wheels;
- a transmission including a first shaft interconnecting a rotary output of the engine to a rotary input of the driveline, a second shaft, a planetary gearset having a first member coupled for rotation with the first shaft and a second member, and a clutch for selectively coupling the second shaft for rotation with the second member of the planetary gearset;
- an energy storage system including a hydraulic pump/motor having a rotary member coupled for rotation with the second shaft, a source of hydraulic fluid supplied to the hydraulic pump/motor, an accumulator, and a valve for controlling the flow of pressurized fluid between the pump/motor and the accumulator; and
- a control system operable to control actuation of the clutch and the valve to define an accumulator charging mode and a hydrostatic power assist mode, wherein the accumulator charging mode is established when the second shaft is driven by the first shaft to cause the hydraulic pump/motor to charge the accumulator with high pressure fluid, and wherein the hydrostatic power assist mode is established when the second shaft which is driven by the hydraulic pump/motor by the release of high pressure fluid from the accumulator for driving the first shaft.

22. The powertrain of claim 21 wherein the transmission further includes a transfer mechanism interconnected to the second shaft, and wherein the clutch is operable to selectively couple the transfer mechanism to the second member of the planetary gearset for transferring rotary power between the first and second shafts.

23. A powertrain for a hybrid motor vehicle, comprising:
- an internal combustion engine operable to generate rotary power;
- a driveline including a pair of wheels;
- a transmission including a first shaft interconnecting the engine to the driveline, a second shaft offset relative to the first shaft, a transfer mechanism coupled for rotation with the second shaft, a reduction gearset having a fixed ring gear, a sun gear coupled for rotation with the transfer mechanism, and a carrier supporting pinion gears meshed with the ring gear and the sun gear, and a clutch operable for selectively coupling the carrier for rotation with the first shaft;
- an energy storage system including a hydraulic pump/motor drivingly coupled to the second shaft, a source of hydraulic fluid, an accumulator, and a valve for controlling the flow of high pressure fluid between the pump/motor and the accumulator; and
- a control system operable to control actuation of the clutch and the valve to define an accumulator charging mode and a hydrostatic power assist mode, wherein the accumulator charging mode is established when the first shaft drives the second shaft for driving the pump/motor to supply pressurized fluid to the accumulator, and wherein the hydrostatic power assist mode is established when the pressurized fluid in the accumulator drives the pump/motor for driving the second shaft to transfer supplemental rotary power to the first shaft.

* * * * *